United States Patent
O'Riordan

(10) Patent No.: US 8,677,260 B1
(45) Date of Patent: *Mar. 18, 2014

(54) ABSTRACTION-AWARE DISTRIBUTED WINDOW CONFIGURATIONS IN COMPLEX GRAPHICAL USER INTERFACES

(75) Inventor: Don O'Riordan, Santa Clara, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 40 days.

This patent is subject to a terminal disclaimer.

(21) Appl. No.: 13/245,193

(22) Filed: Sep. 26, 2011

Related U.S. Application Data

(63) Continuation of application No. 11/476,717, filed on Jun. 29, 2006, now Pat. No. 8,028,243.

(51) Int. Cl.
*G06F 3/00* (2006.01)
*G06F 3/048* (2013.01)

(52) U.S. Cl.
USPC ............ 715/765; 715/762; 715/763; 715/764

(58) Field of Classification Search
None
See application file for complete search history.

(56) References Cited

U.S. PATENT DOCUMENTS

| | | | | |
|---|---|---|---|---|
| 5,394,521 | A * | 2/1995 | Henderson et al. | 715/804 |
| 6,966,033 | B1 * | 11/2005 | Gasser et al. | 715/738 |
| 7,073,149 | B2 | 7/2006 | Knol et al. | |
| 7,165,228 | B2 | 1/2007 | Taylor et al. | |
| 7,627,838 | B2 | 12/2009 | Keswick | |
| 2005/0240892 | A1 * | 10/2005 | Broberg et al. | 716/11 |

* cited by examiner

*Primary Examiner* — Tuyetlien Tran
*Assistant Examiner* — Stella Eun
(74) *Attorney, Agent, or Firm* — Rosenberg, Klein & Lee

(57) ABSTRACT

A user interface to an application processing complex data of multiple data view abstractions allows selection, placement, size and other configurable characteristics of interface components to be controlled by a user and then associated with the data abstraction and processing task. Multiple configurations may be created to simplify the interface to include only necessary controls given an abstraction level of the data view and the task on that data. The configurations may be stored using symbolic references and subsequently loaded on demand into the interface. Mechanisms may be applied to ensure that similarly referenced configurations in storage are resolved and only the desired configuration is applied.

20 Claims, 13 Drawing Sheets

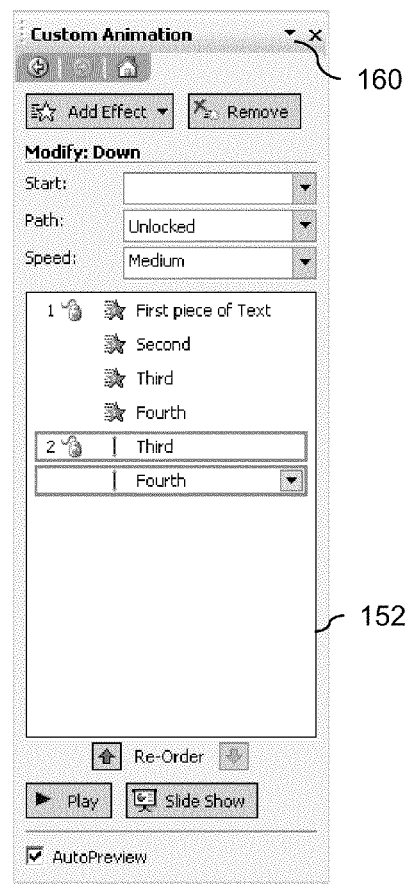
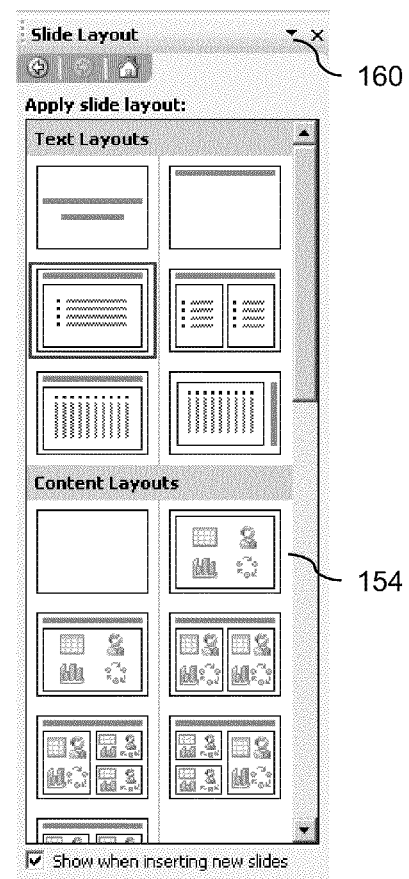
FIG. 1B
Prior Art
FIG. 1C
Prior Art

```
; Register the assistants for use with the Schematic applications;
; Different types of schematic applications are assumed by way of
; example, the editors of each with increasing functionality over the
; previous type Define_procedure(_schematicRegisterDockingWindows()

; create a few lists of docking assistant windows by name
    ; first, an empty list sch = new list()

; create a new of docking windows list called sch2
  sch2 = append (
      list(
         list("Search",          right)    ;name, default position
         list("Navigator:,       left)
         list("PropertyEditor",  left)
         list("DesignExplorer",  right)
         list("ConstrainBrowser", right)
      )
      sch
  )

; register the empty list with the abstraction "Symbol"
_RegisterDockingWindows(Symbol" sch)

; register the bigger list with the abstraction "Schematics"
_RegisterDockingWindows(Schematics" sch2)
```

ABSTRACTION-AWARE DISTRIBUTED WINDOW CONFIGURATIONS IN COMPLEX GRAPHICAL USER INTERFACES

RELATED U.S. APPLICATION DATA

Continuation of U.S. application Ser. No. 11/476,717, filed 29 Jun. 2006.

BACKGROUND OF THE INVENTION

1. Field of the Invention

The invention described herein is most directly related to graphical user interfaces supporting a user's interaction with a computer system. More specifically, the invention allows configuring a Graphical User Interface (GUI) into multiple component distributions and then selecting an appropriate configuration in accordance with associated conditions or desired operations.

2. Description of the Prior Art

As modern computer applications incorporate more features into their interfaces, apportioning the workspace to accommodate the myriad of controls and data displays presents challenges to both the interface designer and the ultimate user of the application. Even previously uncomplicated office programs have evolved over the years into more capable and more complex products, necessitating the authors of such tools to find techniques to somehow present their otherwise overly complex interfaces in some manageable form. No longer are entries created in the main menus for every single command that the program supports, as to do so would overcrowd the interface to render such controls much less effective than any of their predecessors.

Referring to FIG. 1A, there is shown a window configuration of an office application embodying several features typical of the current art. The illustrated application is taken from MICROSOFT POWERPOINT, which produces slides for a user-created presentation, typically in a business setting. To that end, the user interface includes a primary data view pane 110, alternatively referred to herein as a "canvas", a menu banner 120, from which drop-down menus are accessed, and a plurality of user-operable tools located on toolbars 130a-130b. The user interface also provides navigational and application assistance in the form of an outline/slide view pane 140 and a task assistant pane 150.

Modern user interfaces, such as that illustrated in FIG. 1A, contain many user interface components or controls including, but not limited to, banner menus, toolbars, and docking windows. There may be multiple and many toolbars, each of which containing controls suitable to a particular sub-task of the user's design process. The MICROSOFT WORD program from the MICROSOFT OFFICE 2003 SUITE alone contains 22 toolbars. During particular design tasks, such as authoring a document, a user may choose to use and display any or all of these toolbars, but is more likely to make visible only a smaller subset.

A dynamic task pane is one technique used for simplifying the interface of such feature-rich programs. As a specific example, a control to facilitate the animation of a presentation created by POWERPOINT is not provided through any of its standard banner menu choices. Instead, the user operates a control 160 on the task pane, invokes thereby an animation task. The task pane, a separate though related window, is subsequently transformed to an animation task configuration 152 so as to provide access to the necessary animation menus, buttons and other GUI controls, as shown in FIG. 1B. As the user further switches to other tasks via the pull-down choice control 160 at the top of the task pane, the task pane 150 itself changes dynamically to provide access to the appropriate controls for those tasks.

FIG. 1C depicts another exemplary configuration 154, which presents controls related to the task of choosing a layout for a newly created slide in the presentation. Due to the ready availability of the controls on such panes, they are often referred to as "assistant" panes or windows, or sometimes just "assistants".

By comparison to such office applications, the user interfaces of modern Electronic Design Automation (EDA) tools are extremely complex, reflecting the extreme complexity typical of modern Integrated Circuit (IC) design processes. As the complexity of IC manufacturing has increased over time, so too has the complexity of the circuit design process. Accordingly, tool sets for carrying out IC design processes have grown tremendously. The manageability of known EDA user interfaces has progressively degraded from that of earlier, simpler versions, due largely to the sheer number of controls needed to engineer a complete circuit design.

Many office and Integrated Development Environment (IDE) applications of the prior art tend to operate on textual data, which most often permits the same user interface components to be used for different text types. Most modern EDA and other such applications, however, operate on richer sets of data having fundamentally different interactive requirements. Certain user interface components or windows are usable on only a few data views or types, while many others are usable more or less on but a single particular view type.

For example, it may be appropriate for a property editor control to be presented when editing symbol schematics. On the other hand, a constraint browser, which is presented for annotating constraints onto a schematic, is likely quite inappropriate for simple schematic symbol editing tasks. The presence of such a browser when editing symbol views would unduly clutter the user's screen, and likely cause user confusion and frustration.

Modern GUIs now simply offer too many choices in terms of menu picks, buttons, sliders, tables, and other "widgets", the vast conglomeration of which may very easily overwhelm the user. Even more so than in office applications, the user interface controls necessary for completing a given IC design task in an EDA application may be distributed over numerous higher-order controls of different types, such as docking windows, menus, toolbars, and the like. In order to be truly useful in such applications, a user interface must be reduced in complexity despite the elaborate nature of the user's work task. Such reduction would entail simultaneous control of such things as visibility, positioning, float/dock state, and geometry/size of multiple interface components under much greater degrees of freedom than in a simple office application. Moreover, such user interface should support multiple such configurations, to accommodate the numerous and varied complex tasks required of the modern circuit designer.

In many applications, users may require different combinations of interfaces in different user-specific tasks unknown to the original software author or vendor. Present interfaces do not afford the formation of new interface configurations, much less the storage of such in a manner that facilitates recall, such as through some form of naming scheme.

In IC design, the situation is often encountered where a designer, when entering constraints, for instance, may need to closely examine a large portion of his schematic or layout at an appropriate zoom level. All available screen pixels must be freed up for a sufficiently large portion to be displayed, but not to the point where navigational context is lost. The capability to temporarily dismiss then restore all or part of the toolbars and docking windows with ease would enable the designer to meaningfully inspect his design, and then just as easily un-dismiss or re-invoke the toolbars and docking windows to resume modifying design object properties, adding constraints, etc. Clearly, data processed by typical text-based office or IDE applications have no such inspection requirement and such applications thus do not offer this capability. Whereas, GUIs of some modern applications provide zoom and full-screen switching to change the viewing scale and size of a data view, maintaining the zoom level in a particular context during removal then subsequent replacement of GUI tools for a particular abstraction of the data being zoomed is heretofore unseen in known systems.

Thus, the need exists for a user interface configuration system that scales the vast complexity of modern EDA tool sets to a given task and to multiple levels of abstraction in the data being viewed and edited.

SUMMARY OF THE INVENTION

In one aspect of the invention, a method is provided for selectively displaying user interface configurations. A user interface is generated having at least graphical user-operable controls. A list including a set of the graphical user-operable controls is stored in a persistent storage system through a reference to a data view abstraction. The list is retrieved from the persistent storage system by the reference responsive to an event associated with the data view abstraction. The data view abstraction and the set of graphical user-operable controls are displayed in accordance with said retrieved list.

In another aspect of the invention, a data processing system is provided with a processor executing an application to perform data processing operations and to display data in a plurality of data view abstractions via a graphical user interface. The graphical user interface is operable through a plurality of user-operable controls. The data processing system includes a persistent storage system having separately stored therein a plurality of adjustable interface configurations, each of which is associated with a corresponding one of the data view abstractions. The interface configurations provide to the application a placement in the graphical user interface of each of a set of the user-operable controls. An event notification mechanism is provided and is responsive to user-operable controls to transmit to the application a notification associated with one of the data view abstractions. The application retrieves from the persistent storage system a set of the interface configurations corresponding to the data view abstraction responsive to the notification. The user-operable controls are then placed in the graphical user interface in accordance with one of the set of interface configurations.

In yet another aspect of the invention, a data processing system is provided having a configurable user interface. A data storage device of the system has stored therein data respectively presentable to a user in a first data view abstraction and a second data view abstraction. A processor is coupled to the data storage device and accesses the data therein. The processor also executes a first instance of an application to perform data processing operations on the data. An input/output system is coupled to the processor to provide input to and output from the application. The input/output system includes at least one input device for generating user-initiated events and an output device for displaying indicia generated by the application. An application programming interface is provided to the application to be operable by a designated user to associate the first data view abstraction respectively with a plurality of first configurations of the indicia and to associate the second data view abstraction respectively with a plurality of second configurations of said indicia. The first configurations of indicia are distinct respective one with another and the second configurations of indicia distinct respective one with another. The data processing system includes a user interface operable by an end user to select from the first indicia and to distribute the selected first indicia into at least a first configuration thereof. The user interface is operable by the end user to select from the second indicia and to distribute the selected second indicia into at least a first configuration thereof. The data processing system includes a persistent storage system to store separately the first configuration of indicia and the second configuration of indicia so as to be respectively retrievable by a reference to the first data view abstraction and the second data view abstraction in accordance with a corresponding association established by the application programming interface. An event notification mechanism is provided and is responsive to the user-initiated events to transmit to the application a notification associated with the first data view abstraction or the second data view abstraction. The application retrieves a plurality of the first configurations of indicia corresponding to the first data view abstraction or a plurality of second configurations of indicia corresponding to the second data view abstraction as indicated by the notification. A memory cache stores the plurality of the first configurations of indicia or the second configurations of indicia as a plurality of effective configurations. The application subsequently displays on the display one of the effective configurations selected from the memory cache.

BRIEF DESCRIPTION OF THE DRAWINGS

FIGS. 1B-1C are illustrations of assistant windows typical of the prior art;

FIG. 8 is an illustration of an Application Programming Interface script for carrying out aspects of the present invention;

DETAILED DESCRIPTION OF PREFERRED EMBODIMENTS

Figure 1A:
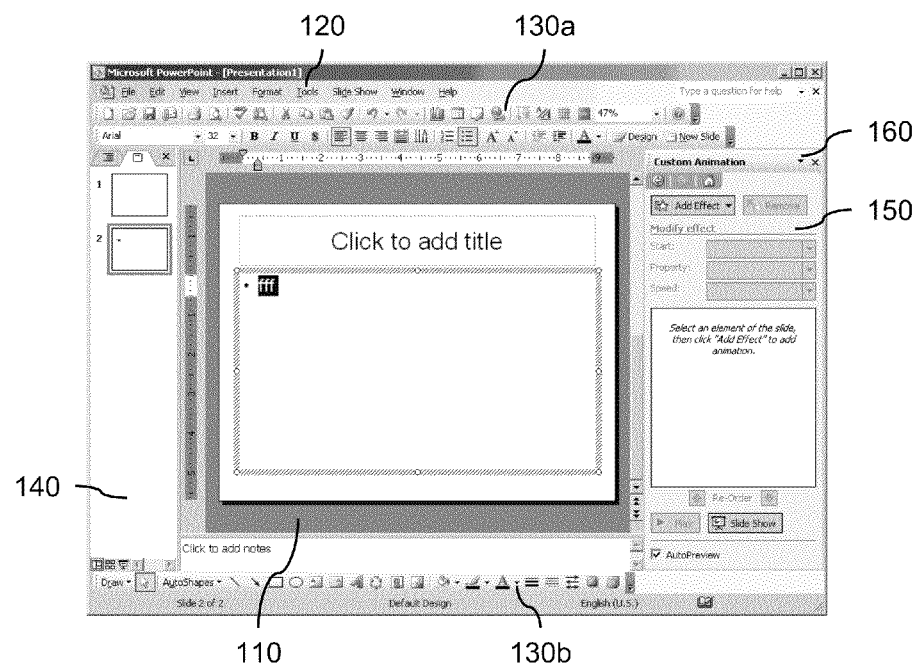
FIG. 1A is an illustration of a graphical user interface configuration typical of the prior art.

In circuit design and other applications, the data defining an article of design may be presented to the user as graphical representations of numerous data abstractions (or as used herein, "data view abstractions"). One example of a data view abstraction is conceptually illustrated in FIG. 2. Data corresponding to the article of design, say a bipolar junction transistor, is stored in memory 210 as one of many data structures 214 known in the computing art. The memory 210 also stores application instruction sequences 212 that, when executed by a processor 205 coupled thereto, performs data processing operations on the data structures 214, in addition to other operations typical of computing platforms known in the art. One such operation may be the execution of processing instructions to implement a user interface 220, which may be a GUI, to allow user access to the data and various application controls. Such user interface implementations are well known in the art and the detailed description of such is omitted in the interest of brevity and clarity.

Figure 2:
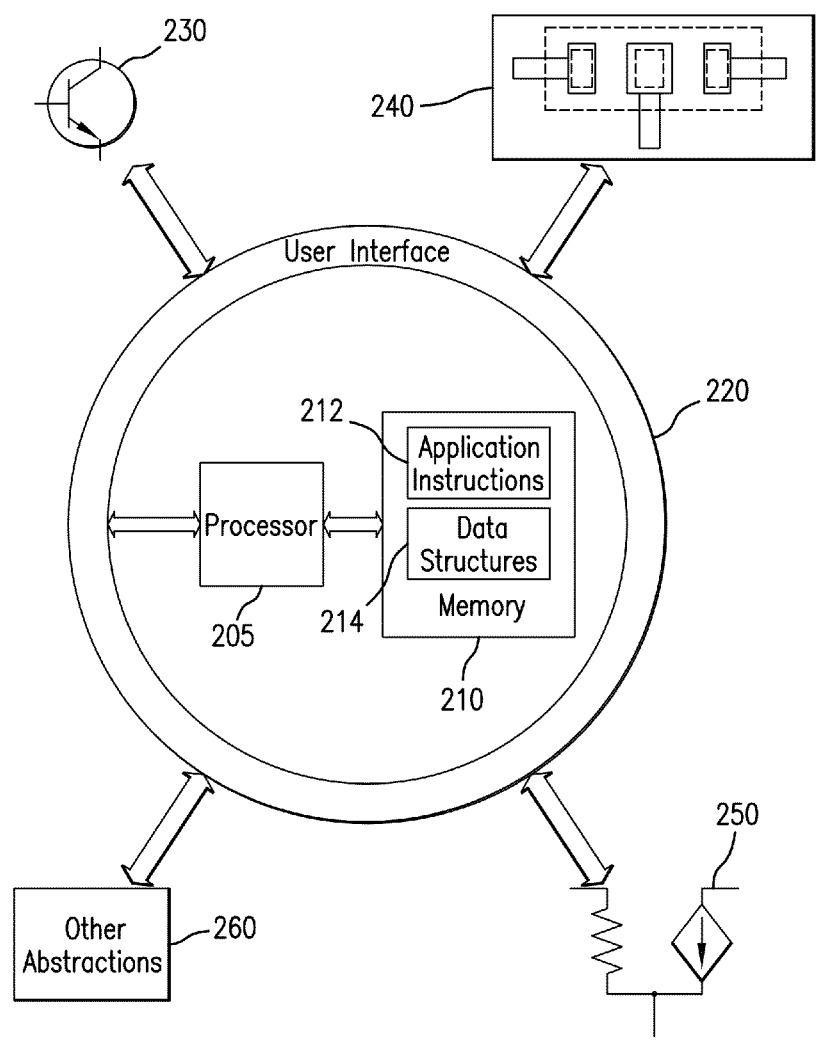
FIG. 2 is a diagram illustrating data abstractions consistent with aspects of the present invention.

As is shown in FIG. 2, the given transistor may be presented to the user via the user interface 220 in a variety of forms, where a particular form or "abstraction level" is selected as appropriate to a given design task. For example, the transistor may be presented as a symbol 230 for placement in a schematic of an overall design, a physical layout cell 240 for laying out the physical features of the transistor within a circuit defined on a substrate, or a model 250 for establishing terminal characteristics of the transistor for both design and design verification purposes.

It should be noted that the model 250, while being illustrated graphically, may be embodied in one of many hardware description languages known in the art. Further, it is to be understood that various other abstractions 260 may be suitably employed, and that abstractions of one data type may include data having their own associated abstractions. For example, an operational amplifier known in the art has its own assigned symbol, layout cell, and circuit model, but typically contains numerous transistors, each also having a symbol, layout cell, and circuit model of its own.

In many applications, ICs are designed hierarchically, with a top-level design cell instantiating multiple lower-level design cells, each of which may instantiate further lower level cells, and so on. Consequently, a user must often interact simultaneously with several data view abstractions at once. When determining if the layout of a particular region of a circuit has any potential open or short circuit points for a given electrical signal, for example, the user may need to interact with a schematic view to select the electrical signal, then observe the various wire paths comprising that signal in the broader layout view. In accordance with the present invention, multiple views of the data are accessible at once, and views are easily switched one with another.

All of the abstractions illustrated in FIG. 2 may be derived from the same transistor data structure in the data structures segment 214 of memory 210. Thus, the user may modify the data through the user interface 220 in a manner specific to the abstraction of that data, and such modification will carry over into other abstractions, where applicable. It becomes desirable, then, to enable the user interface 220 to allow the user to switch easily between data view abstractions, or as commonly referred to in the art, between "cellviews" of a cell, where a "cell" is a circuit design that is modularized in terms of function, technology or for purposes of exportation into other circuits and cells. It should be noted, however, that multiple data view abstractions may each be of a different data type altogether and maintained in memory 210 in corresponding data structures.

Figure 3A:
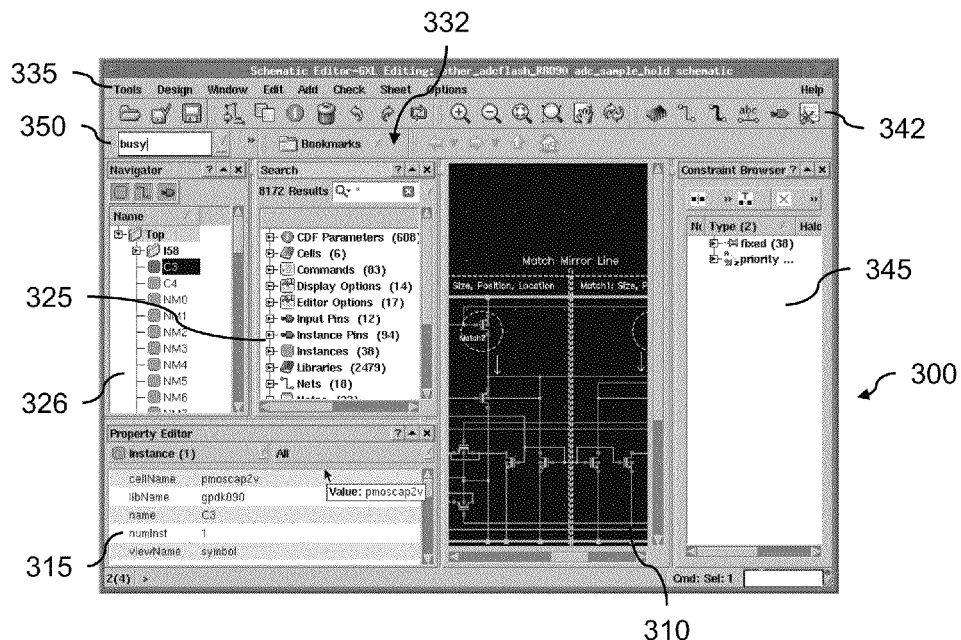
FIG. 3A is an illustration of a crowded graphical user interface of an EDA application.

The user interfaces of EDA applications and others may often be extremely "busy", involving numerous controls, spread over multiple windows, such as illustrated in FIG. 3A. As shown, the viewable area of the workspace canvas 310 is severely obscured by controls, some of which may not be necessary at all for the task at hand. In the particular window configuration shown, for example, a menu banner 335 and toolbar 342 are extraneously accompanied in the desktop view 300 by a property editor window 315, a cell navigator window 326, a search result window 325, a constraint browser window 345, a configuration selection control 350, and a bookmark control 332. For a relatively simple task such as schematic design entry, i.e., placing symbols in the schematic and interconnecting them with wire segments, many of these windows or controls are superfluous and therefore obstruct quite unnecessarily the view of the schematic.

In accordance with certain advantageous aspects of the present invention to be described further below, a user may switch seamlessly to a simpler and cleaner interface, such as that shown in FIG. 3B. There, the workspace canvas 310 is amply accorded the majority of area of the desktop view 300, and only those controls actually necessary for schematic entry are presented to the user, such as found on toolbar 342 and menu banner 335. Once the schematic design task has been completed, the user may switch back to the prior window configuration, or to other configurations previously established with an appropriate combination and arrangement of windows and controls.

In IC layout views in particular, large portions of any design may consist of literally millions of polygons. In order to work freely with such systems, a user needs to zoom in at will to a design area of interest, optimally to a scale where the area is recognizable and the designer is confident he is working on the correct piece. Often, other GUI components, while necessary to create and edit the design in the zoomed-in main canvas area, simply get in the way of the user's view of the very area on which he needs to be fully focused. In accordance with the present invention, simple and quick switching between various window configurations is effectuated, such that a user may temporarily dismiss all extra user interface components that might otherwise compromise his visual focus on the main design content. In certain embodiments of the present invention, this is achieved by one or more keyboard strokes assigned to invoke a procedure for instantly, but temporarily, dismissing and recalling user interface components which might otherwise block the viewable field of the displayed design. The mechanisms for achieving such functionality are described below.

By way of the present invention, a configuration may also include controls outside a given task, such as to access program features not directly involved in circuit design. An exemplary one of such controls is shown by a tab-metaphor view control 360 of FIG. 3B, which serves to switch to other cellviews, say, of a broader circuit design.

Figure 3B:
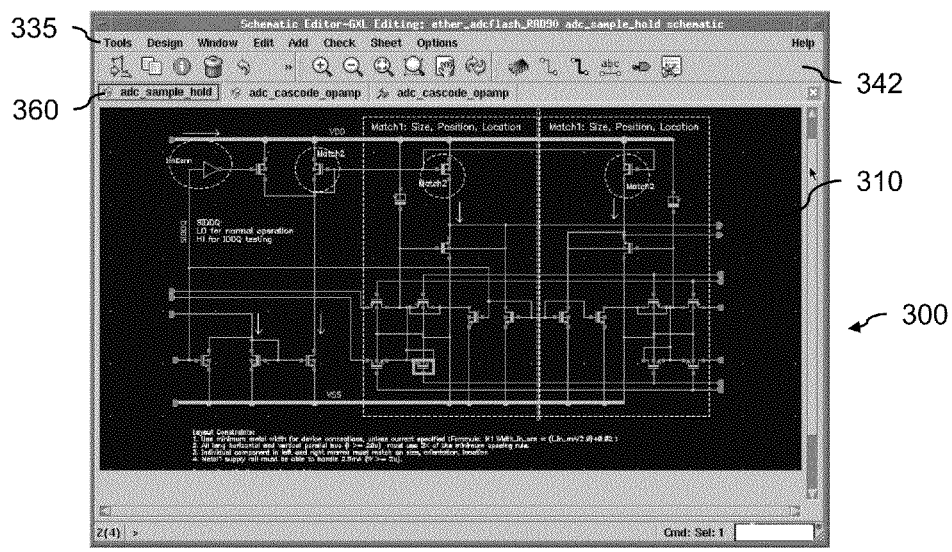
FIG. 3B is an illustration of a schematic abstraction view of an exemplary EDA application implementing the present invention having the assistant windows of FIG. 3A dismissed from the view.
Figure 4:
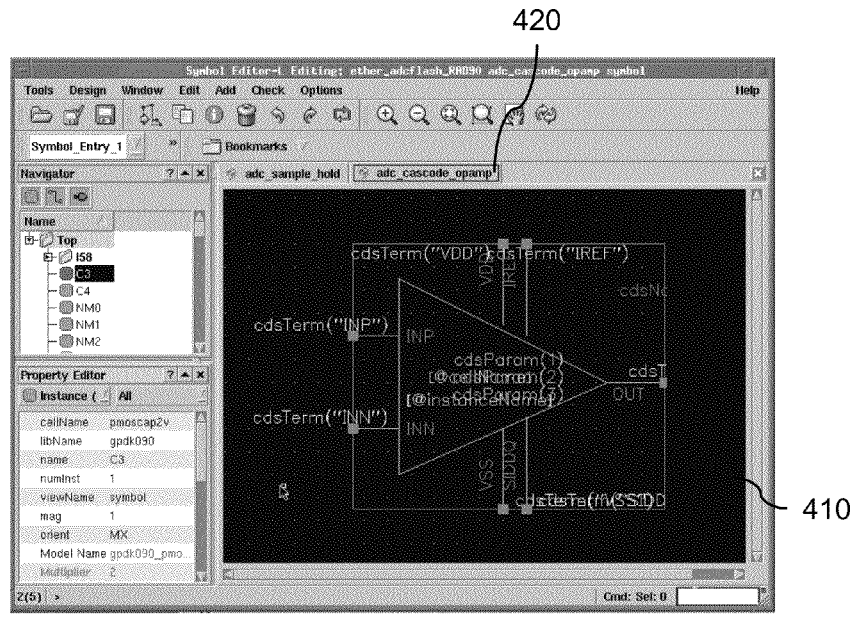
FIG. 4 is an illustration of a symbol abstraction view of an exemplary EDA application implementing the present invention.

The data shown in the cellview 310 of FIGS. 3A and 3B are illustrative of a typical schematic cellview that might be used in EDA embodiments of the present invention. In similar fashion, other embodiments of the present invention may present data in other abstractions, as illustrated in the exemplary symbol cellview 410 of FIG. 4 and exemplary layout cellview 510 of FIG. 5. As previously mentioned, other abstractions may be accommodated in accordance with the invention, as set forth in the exemplary embodiments, suitably implementing the interfaces corresponding to such other abstractions.

To fully support a high degree of hierarchy and their many design abstractions, certain embodiments of the invention provide a Multiple Document Interface (MDI) that allows several cellviews, of possibly different abstraction levels, to be concurrently opened for edit. Typically, MDI presents multiple windows, e.g., the cellviews and control windows, residing in a single parent window, referred to herein as the "desktop view" (this is not to be confused with the desktop presented as an interface to many operating systems). The cellviews are each contained within user-selectable views attributable to a single desktop view, where each cellview selectively obtains operational focus upon, for example, the activation of a selection tool, such as the tab-metaphor selection control 420 shown in FIG. 4 or similar controls 520, 522, and 524 shown in FIG. 5.

Figure 5:
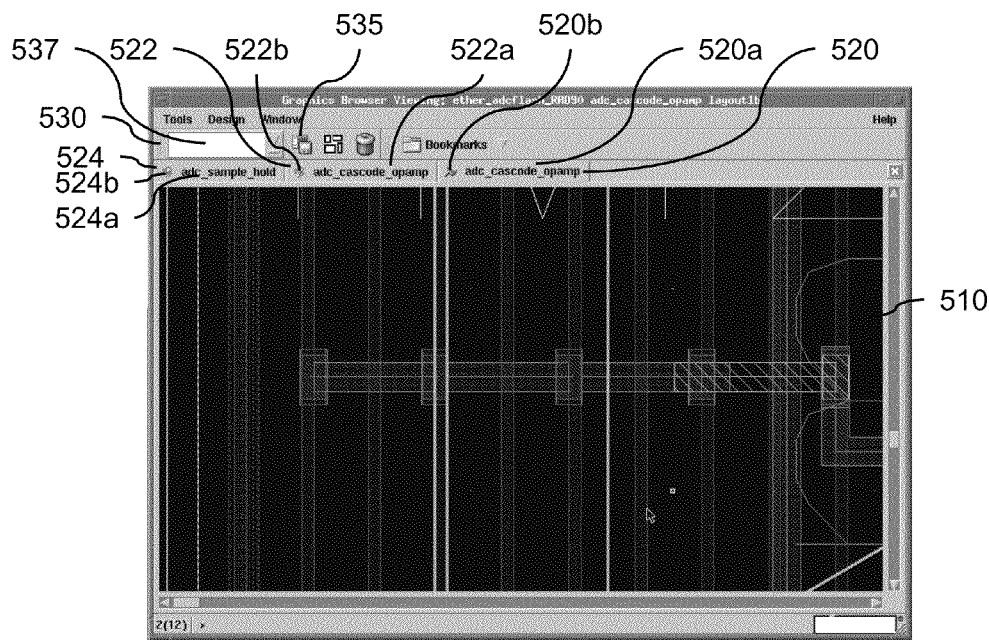
FIG. 5 is an illustration of a layout abstraction view of an exemplary EDA application implementing the present invention.

Referring now to FIG. 5, tab-metaphor controls 520, 522 and 524, are operated in a manner typical of such controls, to switch between the different cellviews associated with each tab. The user interface configuration made visible by the activation of a tab control is known as the tab control's "Tab". Each tab control 520, 522, 524 may include indicia 520a, 522a, 524a indicative of the data being viewed (such as by its given name) and corresponding indicia 520b, 522b, 524b indicative of the particular data abstraction corresponding to the data. This allows identification of the available cellviews of different data and cellviews of the same data in different data view abstractions so as to facilitate navigation therebetween.

The present invention is abstraction-aware in that it makes visible only that subset of controls and windows appropriate to the currently selected abstraction and its unique data manipulation requirements, while hiding or removing from view those controls which are not relevant. The given subset of controls and windows is positioned in the desktop view in a manner appropriate to both the data abstraction and an associated task, into what is referred to herein as a "window configuration".

Each window configuration of the present invention is readily customizable and widely extensible by various end users, (such as Design Leaders and Project Managers, CAD groups, or other organizational entities). The degree of interface complexity from one window configuration to another may be suitably adjusted to accommodate the needs of multiple entities in an organization. Vendor-shipped, pre-configured or hard-coded configuration sets may be customized by experts such as CAD group administrators to create more optimized configurations, which may augment or override those provided by the vendor.

In accordance with certain aspects of the present invention, a user may establish one particular configuration for one project on which he may be working, and another configuration for a different project. He may, in accordance with the present invention, augment or override the CAD-group-supplied configurations globally, or on a per-project basis. For example, the system may allow the EDA software vendor to supply an exemplary window configuration through a window configuration definition for the design constraint entry task, where a "definition" is used herein to refer to the set of data required to unambiguously produce the window configuration as indicia on the display, e.g., window size, content and placement coordinates. Such a definition may be overridden by a user's CAD group with a definition more appropriate to the constraint entry requirements of that CAD group. The definition may be overridden even further, locally, by an end user IC designer who modifies and simply saves his personal preferences under a name that has some meaning to him.

Additionally, since differing projects within an IC design house may require different sets of tools, different versions of tools, or different customizations of tools, the present invention accommodates customization to allow interface definitions on a per-project basis. Further, since each different design house may employ different means to create and manage multiple projects, the present invention enables such definitions to be established through a distributed hierarchy, such that the definitions may be created by end users themselves, by their CAD groups (who may have created many EDA tool customizations), and by the EDA tool vendors themselves. The distributed definition capability of the present invention includes, in certain embodiments, a conflict resolution mechanism for specifying which definition wins (or is found and applied first), in the event of multiple, identically named but differing definitions existing in the distributed system.

In that a designer may be working on several projects at once, different default interface configurations may be set in accordance with the present invention, each optimized for a certain function of the abstraction level, the project, etc. A particular default configuration suitable for a first designer at a given level of abstraction may be, by way of example, distinct from the default configuration for a second designer on that same level of abstraction. To that end, certain embodiments of the present invention include a defaulting mechanism, allowing various designers to specify different default configurations for different abstraction levels, and to even vary the default configurations to suit a particular design project.

Figure 6:
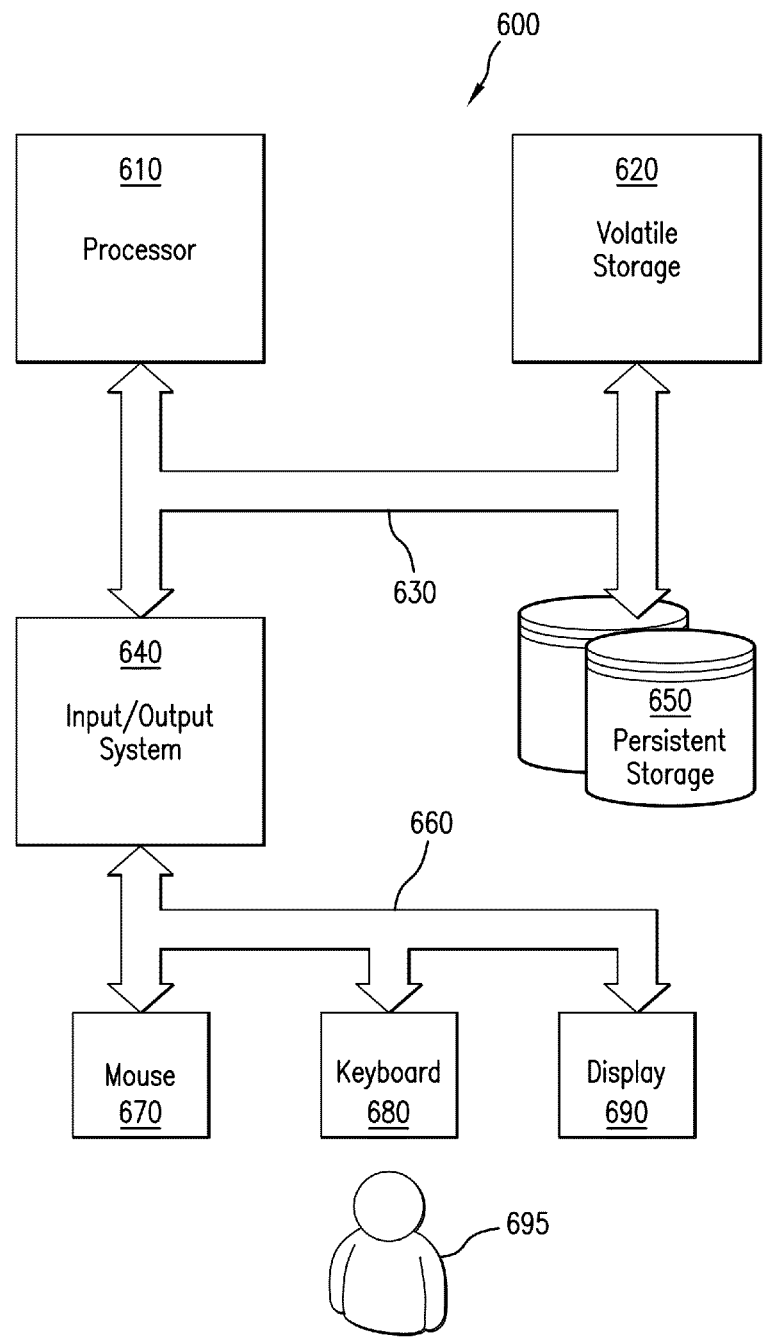
FIG. 6 is a schematic block diagram of an exemplary computing platform for implementing aspects of the present invention.

Having briefly described certain features of the present invention, exemplary embodiments are described in following paragraphs for carrying out such features. In accordance with the present invention, hardware and associated software cooperatively implement a GUI embodying the beneficial features described. Such implementations may be realized on various computing platforms, an exemplary architecture of which is illustrated in FIG. 6. As illustrated, the computing system 600 includes a processor 610, programmably configured to execute sequences of processing instructions defining an operating system, one or more software applications, and other software subsystems. Processor 610 may be a multi-threading processor for executing instruction sequences, either sequentially or in parallel, contained in multiple instruction threads. The exemplary embodiment of the GUI of the present invention is preferably incorporated as a subsystem of a software application, such as an EDA application, running under an operating system being executed on processor 610, in certain cases as a plurality of instruction threads. It is to be understood that this is but one application, described only for purposes of illustration, and the present invention is not limited thereto.

The computing system 600 includes volatile storage 620, such as a random access memory subsystem, persistent storage 650, such as a disk drive subsystem, and an input/output (I/O) system 640. The volatile storage 620, persistent storage 650, and I/O system 640 are coupled in suitable manner to the processor 610 through a bus 630. The I/O system 640 is coupled to a plurality of human interface devices (HIDs) 670, 680, 690 for interacting with a user 695. The HIDs, which include a mouse 670, a keyboard 680 and display 690, are coupled to the I/O system 640 through an I/O bus 660. The HIDs cooperate through associated software components, such as hardware drivers, executed by the processor 610 to implement user-operable controls that provide input to and output from various processes executed on the processor 610.

In terms of hardware, the computing system 600 may be of any suitable type known in the art. The software components described herein are implemented on associated hardware and incorporated into the system configuration of FIG. 6. It is to be understood that the redistribution of some software functionality to that of hardware, and vice-versa, is within the scope of the present invention.

Figure 7:
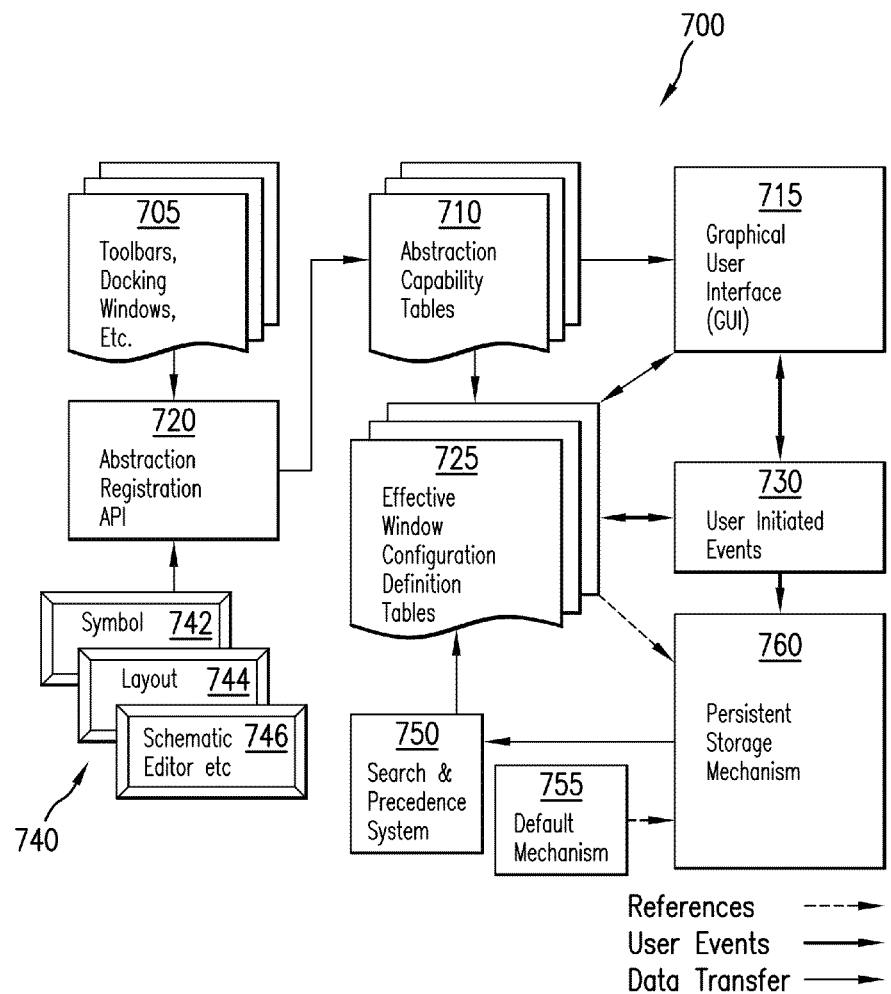
FIG. 7 is a schematic block diagram of an exemplary software embodiment of the present invention.

A schematic block diagram of an exemplary software architecture formed in accordance with one embodiment of the present invention is depicted in FIG. 7. Generally, the software components are in the form of instruction sequences executable by a computing system, such as that shown in FIG. 6. The system of FIG. 7 may be incorporated into a larger application as the GUI therefor, where extraneous details of the application are not shown for purposes of clarity. Additionally, while the description herein is presented primarily in the context of a single computing platform, the software components of the present invention may themselves be distributed over many computing systems, such as over a computer network. The details of these variations are well known and will not be described, but are intended to fall within the scope of the present invention.

The abstraction-aware interface configuration system 700 includes a wide variety of GUI components that may be incorporated into individual window configurations. These components are known in the art to include window controls, toolbars, docking windows, among others, several of which were described with reference to FIGS. 3A, 3B, 4 and 5. In accordance with certain embodiments of the present invention, a designated entity, which, as will be explained below, may be distinct from the ultimate end user, forms lists 705 of those user interface components that are to be controlled in a given desktop view configuration associated with a particular data view abstraction. For example, in the configuration 300 of FIG. 3A associated with the Schematic abstraction, the corresponding list would contain toolbar 342, property editor window 315, cell navigator window 326, search result window 325, constraint browser window 345, configuration selection control 360 and bookmark control 332. Certain embodiments may also include other controls, such as menu items in various menus 335 or in pop-up menus associated with some user action, such as a right mouse-click, as is known in the art. The lists 705 may include controls that are associated with the data view abstraction but are not visible in a particular desk top view arrangement.

The controlled items listed in 705 are preferably incorporated into a distributed window configuration forming the desktop view associated with a particular data abstraction. The controlled items list 705 may be formed by a designated entity via an Application Programming Interface (API) Registration mechanism 720. In certain embodiments of the invention, the designated entity, such as the software vendor or a person designated at a user's CAD group, has access to the API Registration mechanism 720, where the ultimate end user of the software does not. When implemented, embodiments so featured afford tiered control over implementation details of generating the controlled items list 705, thereby allowing the set of controls to be established by the designated entity on a "need-to-use" basis or where it is known that the end user lacks the skills necessary to correctly form the controlled items list 705. For example, allowing a programmer at the user's CAD group access to the API Registration mechanism 720 to establish the controlled items list 705 may prevent frustration and error at the user level when the user has little or no programming skills. It is to be understood, however, that the designated entity and the ultimate end user may be embodied by the same person.

Once the designated entity has completed the controlled items list 705, the API Registration mechanism 705 may be operable to "hard-code" the lists 705 into the software in a suitable manner. Alternatively, the components may be listed in a text file, which is read and parsed by the software at run time to form the controlled items list 705.

The interface configuration system 700 further includes a plurality of sub-tools 740 which allow the manipulation of data through an associated abstraction level. For the exemplary EDA application, the sub-tools 740 may include a symbol editor 742 for creating and editing data through its symbol abstraction, a layout editor 744 for creating and editing data through its layout abstraction and a schematic editor 746 for creating and editing data through its schematic abstraction. Variations of such tools are well known in the art and are generally associated with a graphical editing control, such as the cellviews 310, 410, and 510 of FIGS. 3A-3B, 4, and 5, respectively. The details of the editing functionality of the sub-tools 742, 744 and 746 are well known and will not be detailed herein.

The lists of windows components 705 and the corresponding sub-tool 740 are associated with a data abstraction through Abstraction Registration API 720. The Abstraction Registration API 720 may be implemented by a script language, the syntax of which is not essential to the invention.

An example of a coded script segment 810 is illustrated in FIG. 8. As illustrated in the example, various symbolic references pertain to controls, such as the docking windows "Search" and "ConstraintBrowser", as well as to the abstractions to which such lists of components as "sch" and "sch2" are to be associated, i.e., the references "Symbol" and "Schematics". An API function call of "_RegisterDockingWindows" associates the listed components with the corresponding abstraction level.

By way of the Abstraction Registration API Mechanism 720, the components in the list 705 are made available for window configurations corresponding to a data view abstraction level associated with a subtool 740. These associations are produced by the Abstraction Registration API 720 in the form of Abstraction Capability Tables 710. When the data view abstraction level is switched at runtime, the Abstraction Capability Tables 710 are consulted to determine which particular view-specific components are available to the user.

Figure 9:
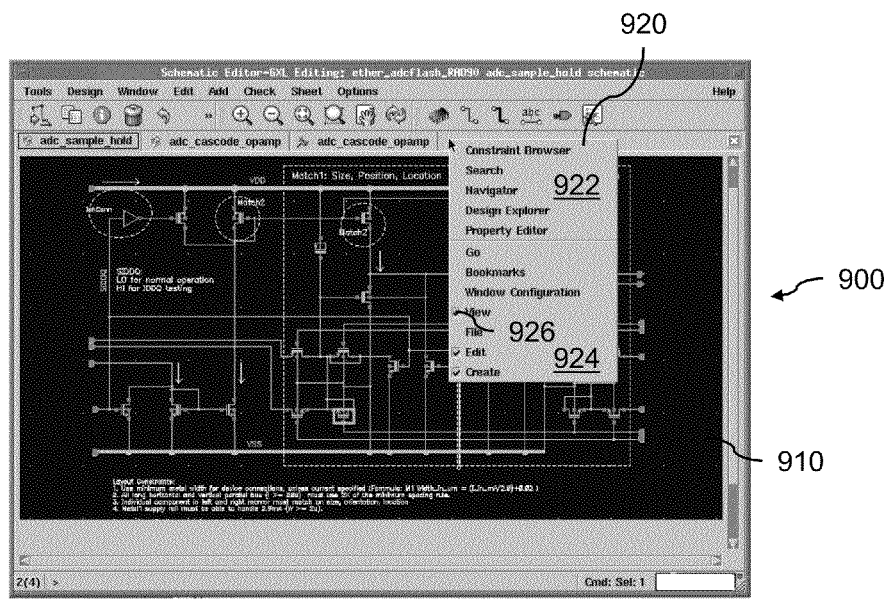
FIG. 9 is an illustration of an exemplary GUI of the present invention with a configuration menu made visible.

This availability is reflected in FIG. 9 illustrating a desktop view 900 appropriate for schematic data entry and editing tasks. The data abstraction level is that of a schematic as is shown by the schematic cellview 910, which is itself part of the schematic editor 746 for editing the actual data to which the cellview 910 corresponds. In the example of FIG. 9, the user has invoked a user interface menu 920, such as by a right-click of a mouse. The menu 920 reveals to the user the assistant windows 922 and toolbars 924 associated through the Abstraction Registration API Mechanism 720 with the current abstraction level. The lists of available controlled interface components may be presented to the user through various other means in accordance with the present invention.

The user interface menu 920 is dynamically created based on the information registered with the Abstraction Registration API Mechanism 720 as stored in the Abstraction Capability Table 710.

Interface configuration system 700 includes a GUI 715, which not only provides those features for completing tasks on a data abstraction level, but also includes mechanisms for carrying out other aspects of the invention. For example, the user interface may include a workspace for allowing the creation of certain window configurations. This may be accomplished in a text based mode such as through a document editing window for entering scripts exemplified in FIG. 8, or through other more be graphically oriented means. For example, in FIG. 9, a user would choose which assistants are to made visible or invisible via the GUI controls in interface 920. Once the appropriate controls have been selected to be visible, such as by toggling a selection control 926, the visible controls may be positioned, stretched and sized appropriately, as previously described. The resizing and positioning of GUI controls is well known in the art and is achieved by, for example, resize handles and drag-and-drop operations.

Such positioning and sizing of controls to configure the interface is simple and intuitive to a user in that he moves items as he would normally in other windows environments. The user is allowed much latitude in the placement and sizing of the controls. Docking windows may be dragged away from their dock areas and floated, for example, and the size of one window may be traded off in preference for the size of another window. In accordance with the present invention, window configuration states such as size, docking state, and position of the window are maintained in an Effective Window Configuration Definition Tables 725. When the user has established a window configuration appropriate to his needs, he may save the corresponding Effective Window Configuration Table 725 into persistent storage, as described below.

Figure 10:
FIG. 10 is an illustration of an exemplary GUI component for implementing a configuration store operation consistent with aspects of the present invention.

GUI 715 may, in certain embodiments, include interface components for storing and loading window configurations. Such mechanisms for saving data into persistent storage are well known in the art and actual implementations vary with the computing platform on which the invention is implemented. Certain embodiments of the present invention may include a window configuration toolbar, such as that of 530 in FIG. 5. Among the controls on a window configuration toolbar may be a save icon, such as that shown at 535. When the user activates the save control through its associated icon 535, he may be presented with a storage interface 1000, as shown in FIG. 10. Through the interface 1000, the user may navigate the file system of the computing platform on which the invention is implemented and then save the configuration by an associated symbol, as also described below.

Figure 11:
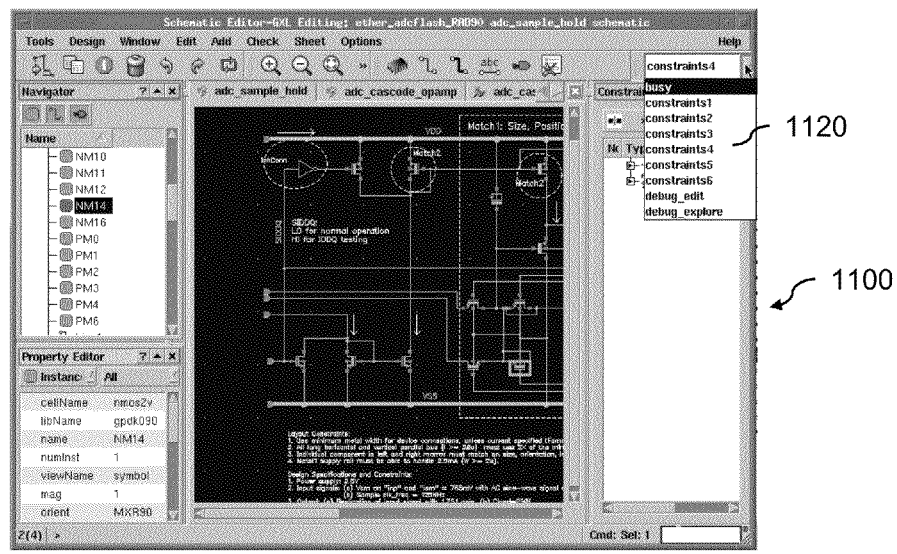
FIG. 11 is an illustration of an exemplary GUI component for implementing a configuration selection control consistent with aspects of the present invention.

Window configuration toolbar 530 of FIG. 5 may also include a configuration recall combobox 537 for loading a window configuration upon a predefined command. For example, when the user activates the drop down control, such as shown in desktop view 1100 of FIG. 11, a list 1120 will be presented and the user may select from previously stored window configurations. Thus, once a window configuration has been stored, the user may easily revisit and reapply that window configuration as a function of his current work task.

The interface configuration system 700 takes certain actions corresponding to user initiated events 730. Many GUI systems operate in conjunction with the operating system under which they are being executed, and when an HID such as a mouse is operated to move a curser into the field of a window and mouse button is clicked, for example, to actuate a graphically presented user-operable control, a message is passed to the window's underlying application that such user action has taken place. The application typically includes one or more callback functions directing action in accordance with a particular message received.

Other user-initiated events 730 include user input not established through the GUI. For example, to efficiently and easily maximize the number of screen pixels available for actually displaying viewable design data, such as in the schematic or layout cellviews, certain embodiments of the invention enable the temporary dismissal and recall of user interface components consuming large amounts of area in the desktop view. This may be accomplished through a key combination of the keyboard, such that when a particular combination of keyboard events is issued by the user, such events often referred to as "bindkey" events, the software may responsively hide or recall those controlled interface components that are excessively consuming viewable space. For example, the GUI may hide all docking assistants and toolbars, or perhaps a selected set, in response to a bindkey event such as "Ctrl-A", or other such key combination. Alternatively, multiple bindkey events may be employed. For example, one bindkey event may be employed to hide all extra docked assistant windows and then another to reestablish those windows in the desktop view.

Preferably, the programming and association of bindkey events is effected in a manner similar to that in establishing other window configuration features. In this regard, the abstraction registration API may include command structures for establishing such association. For example, one might use a syntax similar to, hiSetBindKey ("Schematics" "Shift<Key>A" hiLoad Window Configuration ('constraints1')"). Through this command, the exemplary software system provides an API function called hiSetBindKey allowing the user to associate a given key event such as the "Shift-A", to be associated with a given call to load and apply a particular window configuration, i.e., "hiLoadWindowConfiguration ('constraints1')"), registered for the "Schematics" level of abstraction. Multiple bindkey registration calls such as this may be made to associate different keystroke combinations for loading differently named window configurations for any given level of design abstraction.

As shown in FIG. 7, interface configuration system 700 includes a Persistent Storage Mechanism 760. The Persistent Storage Mechanism 760 provides means to store and retrieve the configurations and components thereof in accordance with a predetermined database convention. An exemplary database scheme and storage format allows the following information to be stored as a definition in a disk file: exactly which subset of docking window assistants are shown docked; exactly what subset of docking window assistants are shown floating; exactly which subset of docking window assistants are hidden; exactly which set of toolbars are shown docked; exactly which subset of toolbars are shown floating; exactly which subset of toolbars are hidden; exactly which are the relative on-screen positions in geometries of the docking assistants, whether they are floating or docked or hidden; and exactly which are the relative on-screen positions and geometries of the toolbars, whether floating, or docked, or hidden. Of course, other data fields may be applied depending on the actual implementation, and other related information may also be stored within the database and acted upon by the system in accordance with the present invention. The syntax or database structures of the files themselves may be either textually based, such as through Extensible Markup Language (XML) text, or of a suitable binary format known in the art.

Persistent Storage Mechanism 760 implements a distributed storage mechanism in persistent storage 650 shown on FIG. 6, an exemplary embodiment of which is described with reference to FIG. 14. As previously stated, the configurations to be customized are preferably provided in accordance with the needs of a particular organizational entity such as a CAD group, a vendor or individual users. The distributed storage mechanism of the present invention provides the logical means for storing multiple definitions of window configurations. This storage may be accomplished in a number of ways so as to match a particular file system on a given computing platform. Certain embodiments implement the distributed storage mechanism as multiple window configuration databases stored on persistent storage 650 as named disk files in appropriate directories designated for storing those window configurations. Exemplary database file names include "constraints1.winConfig" or "constraints2.winConfig". The name of the window configuration may be encoded into the name of the file, which simplifies the search for the window configuration upon retrieval. Window configuration files may be stored in appropriately named directories corresponding to different abstraction levels.

Interface configuration system 700 includes also a search and precedence system 750 allowing the file system to be searched for files in accordance with the database schema. The search and precedence procedures are described in more detail with reference to FIG. 14.

The Default Mechanism 755 is provided such that a user may choose any particular window configuration and specify that as his default preference for a given level of abstraction. Thus, each time the user invokes the interface and switches to a view corresponding to that level of abstraction, the user's default preference is initially applied. In certain embodiments of the present invention, the Default Mechanism includes a user interface for specifying a default configuration and persistent storage for that default.

Figure 12:
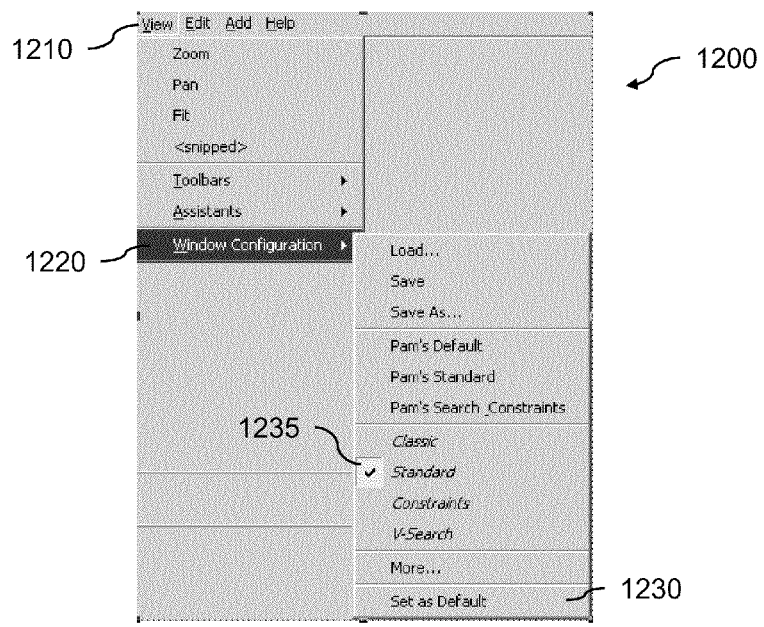
FIG. 12 is an illustration of an exemplary GUI component for setting a default configuration in accordance with aspects of the present invention.

Referring to FIG. 12, there is shown an exemplary user interface for setting the default window configuration for a particular level of design abstraction. Upon selection of the cellview and the window configuration that the user wishes to set to the default configuration for that level of abstraction, the user would activate a control, such as the "Set as Default" menu option 1230. The "Set as Default" control may be under sub-menu "Window Configuration" 1220 falling under a view menu 1210 located on a menu bar. When the view is in the default window configuration, the menu item 1230 may be "checked" through actuation of a mouse and displayed by indicia similar to that at 1235 to indicate that the window configuration for the current level of abstraction is that currently presented to the user. Of course, many other mechanisms may be used to set the default. In one such alternative mechanism, the system maintains a recently used window configuration list for maintaining a window configuration that was in effect for a given level of abstraction when the software was last exited. That window configuration may then be established as the default.

Figure 13:
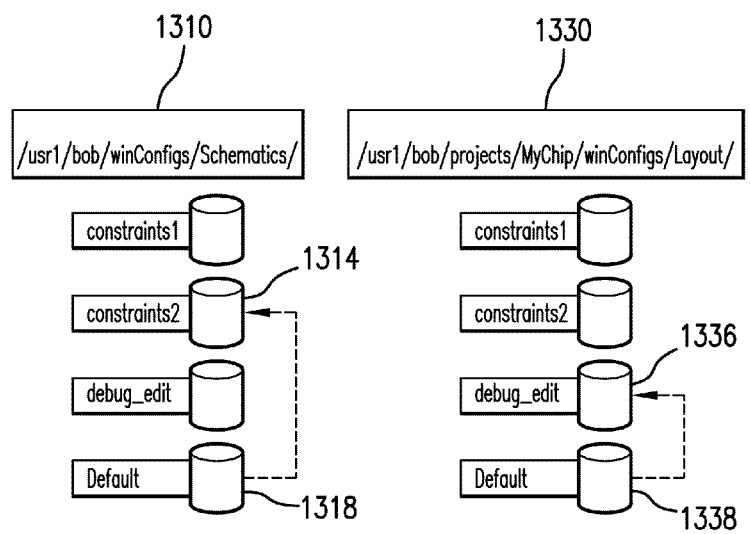
FIG. 13 is a schematic block diagram illustrating an exemplary default mechanism consistent with aspects of the present invention.

Memory of the default window configuration may be achieved by creating a default file as shown in FIG. 13. In the example of FIG. 13, the user has several window configuration files in the file system 1310 for the schematic level of abstraction. In certain embodiments of the invention, another file named "Default" 1318 is created by the system to store the name of the default window configuration. When the user selects the configuration "constraints2" 1314 as the default, the file "Default" 1318 having a reference to the constraints2 configuration file is created. The reference may be a simple text string such as "constraints2".

While various defaulting mechanisms may be used in accordance with the present invention, it is to be noted that a default file may be used to similar effect at different levels of abstraction. For example, in the file system corresponding to the layout abstraction 1330, the user may prefer the default file 1338 to indicate a debug edit window configuration 1336 to be the default for the given level of abstraction. In that case, the default file will, for example, contain the text string "debug_edit" as the reference to the file.

Figure 14:
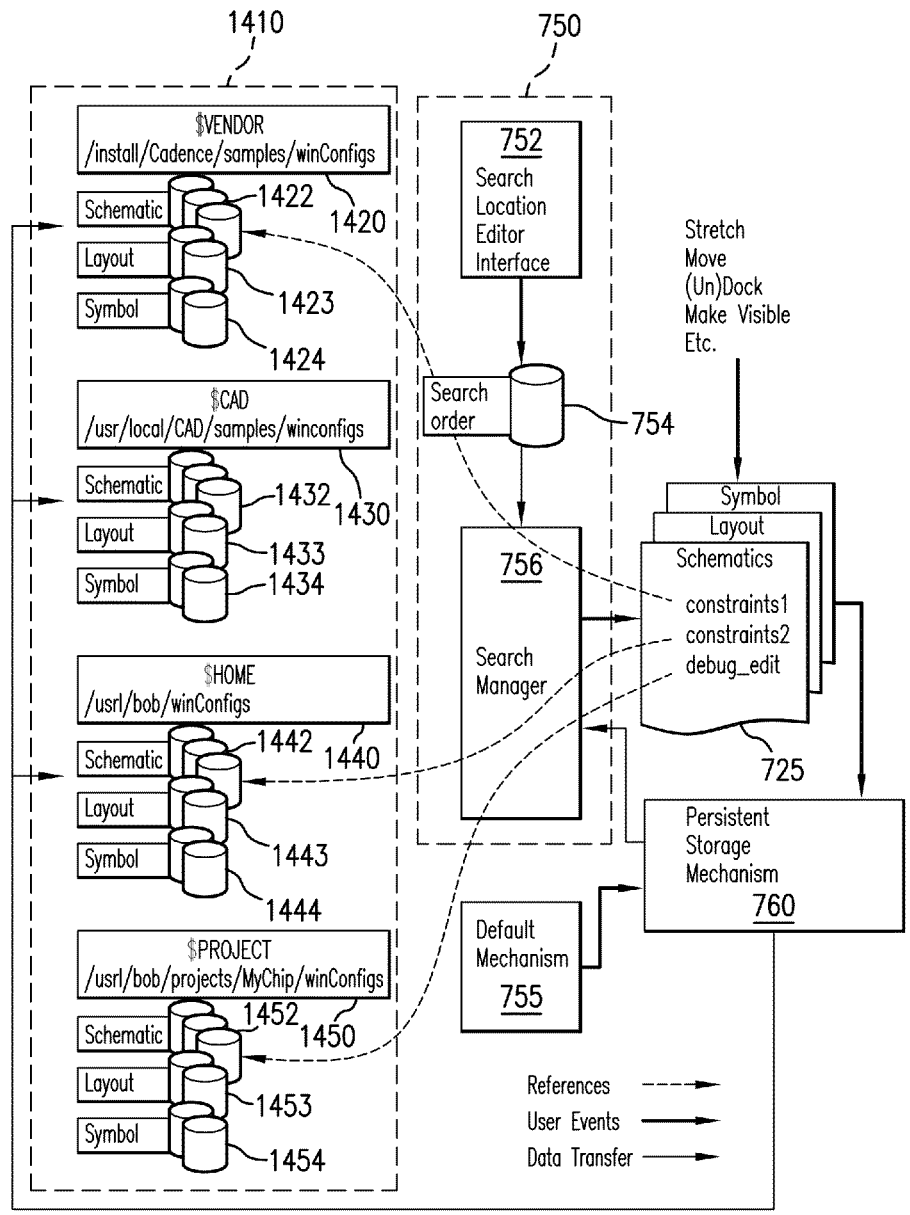
FIG. 14 is a schematic block diagram illustrating exemplary persistent storage of GUI configurations consistent with aspects of the present invention.

Certain aspects of the distributed persistent storage system of the present invention are illustrated in the exemplary embodiment of FIG. 14. In the Figure, like reference numerals to features previously described refer to like exemplary components. The diagram of FIG. 14 demonstrates the window configuration definition storage and loading mechanisms consistent with certain aspects of the present invention.

Persistent Storage Mechanism 760 operates in one aspect of the invention as an interface to a file system 1410 such as is well known in the art. The file system 1410 may physically exist on persistent storage 650 shown in FIG. 6. According to certain embodiments of the invention, the file system 1410 is divided into several volumes or directories 1420, 1430, 1440, 1450, each corresponding to a particular organizational entity. For example, the directory "$VENDOR/install/Cadence/samples/winConfigs" 1420 may be a volume of window configuration definitions as shipped from the vendor. Similarly, directory 1430 may hold window configuration definitions corresponding to a user's particular CAD group, directory 1440 may hold definitions particular to a user, and directory 1450 may hold definitions associated with a particular project. Each of the directories 1420, 1430, 1440, 1450 include respective subdirectories 1422-1424, 1432-1434, 1442-144, 1452-1454, dedicated to the storage of window configuration definitions and associated components for the different layers of abstraction, e.g., schematic, layout and symbol.

In the simple implementation depicted in FIG. 14, the multiple window configuration definitions are stored as named disk files on the file system 1410 in an appropriate directory designated for storing those definitions. The database file names may be simple, such as "constraints1.winConfig" or "constraints2. winConfig". In certain embodiments of the invention, the name of the window configuration is encoded into the name of the file, and it is this name which, upon request therefore, is both sought and presented to the user in a selection tool combobox, as is shown at 1120 in FIG. 11. Further, in certain embodiments, window configuration definition files are stored in directories appropriately named with different abstraction levels 1422-1424, 1432-1434, 1442-1444, 1452-1454. In the Figure, the symbols $HOME, $PROJECT, $CAD, and $VENDOR are environment variables maintaining references to different locations in the file system respectively associated with a user's home directory, a particular project upon which that user is working, a particular customization/installation from the user's CAD group, and the definitions installed with the software received from the vendor. Each of the directory path names pertains to a different cellview extraction level, such as schematic, layout, or symbol.

Persistent Storage Mechanism 760 stores and recalls window configuration files from the file system through the path name in a suitable manner. For example, as is shown in FIG. 14, the window configuration "constraints1" is stored in the file system 1410 as "$VENDOR/install/Cadence/samples/winConfigs/schematic/constraints1.winConfig", shown at 1420, and the window configuration associated with "constraints2" is stored on the file system 1410 as "$HOME/usr1/bob/winConfigs/Schematic/constraints2.winConfig", shown at 1440. It should be appreciated that the file names used for demonstrating the exemplary file system may be substituted by other encoding methods, logical and/or physical, so as to be operative on other file systems.

The window configuration definitions are retrieved from the file system 1410 upon request by the user or the system and cached in memory as an Effective Window Configuration Definition Table 725. Conversely, window configurations held in memory as an Effective Window Configuration Definition Table 725 may be stored as a definition file onto the file system 1410 through the Persistent Storage Mechanism 760. Thus, a window configuration may be modified by stretching, moving, undocking or docking, and making visible/invisible certain windows components and then subsequently saved onto the file system as a new window configuration, or as a replacement for the window configuration referenced by the same file name.

In that the present invention provides cached window configurations through the Effective Window Configuration Definition Tables 725 maintained in memory, the most recently created or modified definition is available for use without having to revert to the last stored version on disk. To illustrate, a user may load a window configuration called "constraints1" corresponding to the definition stored in the "constraints1.winConfig" file on the user's file system. The user then interactively resizes the docking windows to an alternate state and, in so doing, modifies the definition of the "constraints1" window configuration in memory through the Effective Window Configuration Definition Table 725, without having taken any separate steps to explicitly save the window configuration definition to the file system 1410.

Next, suppose the user switches to a Symbol cellview by clicking on the appropriate tab control. This action causes the interface to switch to a different window configuration named, for example, "symbol_entry_1". When the user switches back to the schematic cellview by clicking on the appropriate tab control, the system once again chooses the "constraints1" window configuration. The cached copy of the definition 725 is consulted and user interface preferably reverts to that window configuration. It does not revert to the original configuration previously loaded into memory from the file system. The user then sees the interface for the schematic cellview in exactly the same state as he had left it with the effective "constraints1" window configuration. If, however, the user were to exit the session and start it up anew, reopening the schematic abstraction cellview and choosing the "constraints1" window configuration, his interface would be presented as that stored on the file system. Thus, certain embodiments of the present invention allow the cached representation to be in effect only for the life of the running process and not across multiple invocations of the process. Should the user prefer to consistently use the modified version of the window configuration, certain embodiments of the present invention allow him to explicitly save such to the file system 1410, as previously described.

As is shown in FIG. 14, Default Mechanism 755 accesses the file system through Persistent Storage Mechanism 760. The Default Mechanism 755 creates the "Default" files in accordance with the above description through the file system interfacing mechanism of the Persistent Storage Mechanism 760.

Search and precedence system 750 operates on the file system 1410 through Persistent Storage Mechanism 760 to locate files containing requested window configurations. In the example of FIG. 14, the system recognizes three different window configurations available for the schematics level of abstraction, specifically, "constraints1", "constraints2", and "debug_edit". Assuming a search is directed appropriately to locate all of the configurations, the user would find the list of available window configurations to appear in the window configuration toolbar combobox 1120 of FIG. 11 whenever the currently active Tab is showing or editing a view type of the abstraction level "Schematics".

To search for particular previously stored window configurations, certain embodiments of the invention search for directory files of the form " . . . /winConfigs/<abstraction>/<name>.winConfig", where <abstraction> is one of the abstraction levels specified through the Abstraction Registration API Mechanism 720. The variable <name> may be a name chosen by the user to be associated with a given work task. In the given exemplary embodiment, the file system 1410 is searched via Search and Precedence system 750 for path names, or absolute filenames, structured in the predetermined patterns given above and then retrieves the set of available window configuration files for the requested cellview abstractions from which the Effective Window Configuration Definition Tables 725 are then extracted.

In certain applications, there may be multiple definitions of window configurations with the same name for a given data abstraction. For example, the files:

"$HOME/winConfigs/Schematics/constraints1.winConfig",

"$PROJECT/winConfigs/Schematics/constraints1.winConfig",

"$CAD/winConfigs/Schematics/constraints1.winConfig", and

"$VENDOR/winConfigs/Schematics/constraints1.winConfig"

may all exist simultaneously on the file system. These files are preferably stored in multiple different directories to differentiate these identically named definitions and to subsequently determine which definition to apply when the user chooses the "constraints1" window configuration.

In certain embodiments of the present invention, a programmable search lookup order is incorporated into the system. This is achieved in certain embodiments by creating a search order file 754, which is created and modified through a search location editor interface 752. The search order file 754 may simply contain an ordered list, such as the ordered list of environment variables corresponding to the organizational entities. For example, the search order file may contain the following:

$HOME $PROJECT $CAD $VENDOR or, alternatively, it may be configured to have the following information instead:

$PROJECT $HOME $CAD $VENDOR.

In the examples given above, the search manager 756 consults the search order file 754 to determine therefrom which of the four "constraints1" window configuration definitions to load and apply when the user is interacting with the schematics level of abstraction for the "constraints1" task. Other suitable mechanisms may be employed to specify a search order without departing from the spirit and scope of the present invention.

To illustrate further beneficial features of the invention, another exemplary search order file is created by, say, the CAD group containing the following contents:
  $PROJECT
  $CAD.
In this example, only two directories will be searched for definition files and, thus, only window configurations created by a CAD group for certain projects will be accessible to the end user of the software. Any window configuration stored by the user under his $HOME directory would not be accessible, and neither would those supplied by the vendor as stored in the $VENDOR directory. The system is thereby configurable to locate and apply window configuration definitions as deemed appropriate for a given user's design site and to allow multiple definitions to be created and co-managed.

Search manager 756 is responsive to a user-initiated event "Load", or some similar event, to apply a previously saved window configuration. For example, assuming the existence of the following window configuration definitions in the file system:
  $HOME/winConfigs/Schematics/constraints1.winConfig
  $HOME/winConfigs/Schematics/constraints2.winConfig
  $HOME/winConfigs/Schematics/debug_edit.winConfig
  $HOME/winConfigs/Layout/debug_edit.winConfig
  $HOME/winConfigs/Symbol/debug_edit.winConfig
  $PROJECT/winConfigs/Schematics/
constraints1.winConfig.
  $CAD/winConfigs/Schematics/constraints1.winConfig
  $VENDOR/winConfigs/Schematics/
constraints1.winConfig
  $VENDOR/winConfigs/Schematics/MyFavorite.winConfig,
and also assuming a search order file 754 containing the following:
  $PROJECT
  $HOME
  $CAD
  $VENDOR,
an attempt by the user to apply a "MyFavorite" window configuration will cause such definition to be sought for first in the $PROJECT directory. Failing that, the system will attempt to find and apply a "MyFavorite" window configuration from the user's $HOME directory, after which it will attempt to find from the $CAD directory. Finally, it will successfully find the "MyFavorite.winConfig" file in the $VENDOR directory of vendor-supplied examples, within the directory:
  $VENDOR/winConfigs/Schematics/MyFavorite.winConfig.
Given the same examples, if the user were to choose a window configuration named "constraints2", the system would find and apply the definition from:
  $HOME/winConfigs/Schematics/constraints2.winConfig.
Similarly, were the user to choose the "constraints1" window configuration, the following definition would be applied instead:
  $PROJECT/winConfigs/Schematics/
constraints1.winConfig.
The search manager 756 locates and loads the file specified by the search order programmed into the search order file 754.

Figure 15:
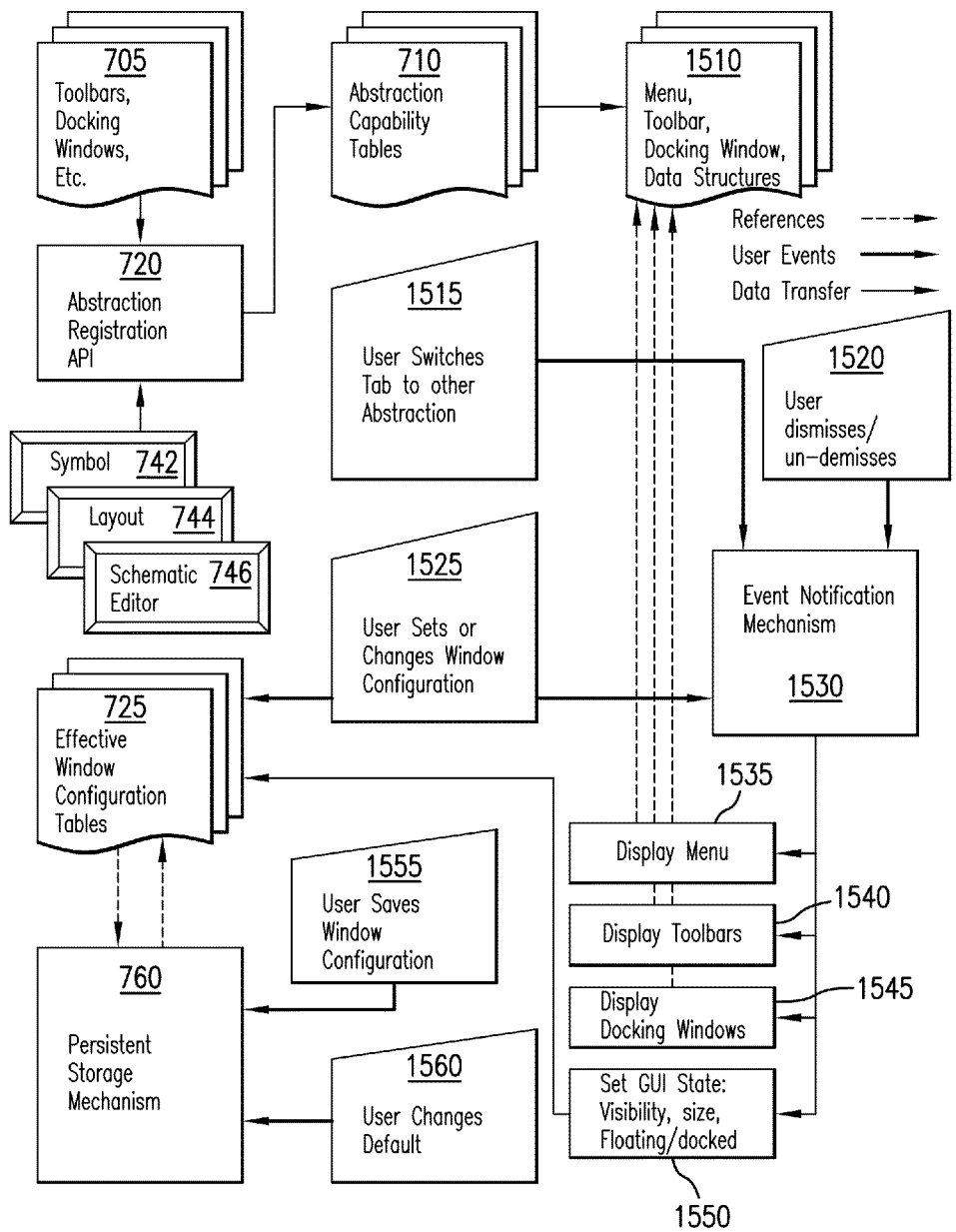
FIG. 15 is a functional block diagram illustrating user interaction with an exemplary embodiment of the present invention.

Referring to FIG. 15, there is shown a functional block diagram illustrating interoperable components and procedures of an exemplary EDA GUI embodiment of the present invention to include operability of certain user actions. In the Figure, like reference numerals to those previously used herein refer to like elements.

For purposes of demonstration, it will be assumed that the user has established a window configuration for each of the data abstractions Schematic, Layout, and Symbol for, say, an operational amplifier. The user may have done so by manipulating view or abstraction-specific component controls that were registered during program startup via API scripts and the Abstraction Registration API Mechanism 720 as described above. During program initialization, and before user interaction, the Symbol editor 742, the Layout editor 744 and the Schematic editor 746 would have been associated with corresponding GUI components 705 in accordance with the API scripts and the Abstraction Registration API 720 would have generated Abstraction Capability Tables 710 for each configuration. The components listed in the Abstraction Capability Tables 710 are available to the GUI through corresponding data structures 1510, which may be retrieved by the GUI from libraries of such components as needed. The user may have then arranged a subset of the controls maintained in data structures 1510 into a desired window configuration. The window configuration definition, as tracked through Effective Window Configuration Definition Tables 725, may have then been stored in persistent storage system 650 through Persistent Storage Mechanism 760. Further, as described above, the user may have established a particular window configuration as a Default configuration for each corresponding abstraction, as indicated at block 1560.

When the application implementing the GUI is executed and the user opens a design file of the exemplary operational amplifier and selects the data abstraction level for a design task, an Effective Window Configuration Table 725 is built in memory from the Default configuration file accessed through Persistent Storage Mechanism 760, as described above. Additionally, a callback procedure is invoked by Event Notification Mechanism 1530 which displays the menus, indicated at 1535, the toolbars, indicated at 1535, and the docking windows indicated at 1545. Other controls known in the art may also be displayed through the appropriate event notification means. The GUI state of the various controls is maintained in memory through the Effective Window Configuration Tables 725, as indicated at block 1550.

When the user wishes to maximize the visible extent of the cellview, the user may provide to the system the indication of such through, for example, the bindkey operation described above. When the keystroke combination for dismissing certain GUI components is actuated, the message of such is received by Event Notification Mechanism 1530 and a previously stored definition is applied having the corresponding menus, toolbars, and docking windows removed from the items to be displayed, as indicated at blocks 1535, 1540, and 1545, respectively. Subsequently, when the user wishes to reestablish the configuration, the corresponding bindkey operation is performed, as indicated at block 1520, and another definition associated with the bindkey is applied, and the selected controls displayed, as indicated at blocks 1535, 1540, and 1545.

As described above, the cellviews corresponding to each data abstraction may have a respective tab control, as illustrated in FIG. 5, such that the active Tab is displayed with its corresponding window configuration. To switch to another cellview, the user activates a tab control corresponding to the other cellview, as indicated at block 1515, such as by locating a cursor over the tab control and actuating a mouse button. A message from the operating system that such action has taken place is provided to Event Notification Mechanism 1530 and a callback procedure corresponding to the event is invoked. The callback procedure loads the abstraction-specific window configuration from either persistent storage via Persistent Storage Mechanism 760, or from the cached copy thereof maintained by Effective Window Configuration Tables 725.

When a window configuration has been loaded and displayed, the user may move, size, add, delete, dock, or undock the controlled components specified for the corresponding data abstraction in the Abstraction Capability Tables 710. The changes to the configuration are tracked by a corresponding Effective Window Configuration Table 725 in memory. When the user is satisfied with the new configuration, he may save it into persistent storage 650 via Persistent Storage Mechanism 760, as indicated at block 1560.

The descriptions provided above are intended to illustrate the present invention by way of exemplary embodiments thereof and are not intended to limit the scope of the invention in any way. Many variations of and modifications to the exemplary embodiments will become apparent to the skilled artisan upon considering this disclosure without departing from the spirit of the present invention. The intended scope of the present invention, which is limited only by the appended claims, encompasses all such variations and modifications.

What is claimed is:

1. A method for selectively displaying user interface configurations comprising:
    generating at least two user interfaces respectively configured for different types of data view representations for a circuit design shared in common between said at least two user interfaces, said user interfaces configured to selectively include different corresponding sets of graphical user-operable controls, one set different relative to the other;
    storing in a persistent storage system, through a reference to a data view representation, a list for each user interface defining a set of adjustable configurations of said graphical user-operable controls; each said data view representation comprising a cellview for at least one abstraction level of representation for said circuit design;
    retrieving said list for a corresponding user interface from said persistent storage system by said reference responsive to selection of a data view representation of said circuit design; and,
    displaying said corresponding user interface adaptively configured based on the type of said data view representation selected, said corresponding set of said graphical user-operable controls configured in accordance with said retrieved list specific to the selected data view representation.

2. The method for selectively displaying user interface configurations as recited in claim 1 further including:
    storing in said persistent storage system, through a reference to another data view representation, another list including another set of said graphical user-operable controls;
    retrieving said other list from said persistent storage system by said reference to said other data view representation responsive to an event associated with selecting said other data view representation; and
    displaying said other data view representation and said other set of said graphical user-operable controls as specified in said other list.

3. The method for selectively displaying user interface configurations as recited in claim 1, where said retrieving of said list includes:
    searching said persistent storage system for said list by locating said reference to said data view representation;
    retrieving a plurality of lists referenced by said data view representation;
    storing said plurality of lists in a memory cache; and
    selecting one of said plurality of lists as said list specifying said set of said graphical user-operable controls for display.

4. The method for selectively displaying user interface configurations as recited in claim 3, where said storing said list in said persistent storage system includes providing said list with a symbolic reference.

5. The method for selectively displaying user interface configurations as recited in claim 4, where said selecting of said list includes activating a user-operable control to select said list by said symbolic reference provided thereto.

6. The method for selectively displaying user interface configurations as recited in claim 4 further including:
    providing a file system for maintaining files on said persistent storage system;
    providing a file name in accordance with said file system as said symbolic reference; and
    storing in said persistent storage system said list by said file name.

7. The method for selectively displaying user interface configurations as recited in claim 1 further including:
    providing said user interface to an application executed by a processor, said application operated to perform data processing tasks on the data residing in memory; and
    providing an application programming interface to said application for generating said list of said set of graphical user-operable controls.

8. The method for selectively displaying user interface configurations as recited in claim 1 further including:
    activating a first user-operable control and responsive thereto displaying a subset of said graphical user-operable controls absent at least one of said set of graphical user-operable controls; and
    activating a second user-operable control to redisplay said set of graphical user-operable controls.

9. The method for selectively displaying user interface configurations as recited in claim 8 where at least one of activating said first user-operable control and activating said second user-operable control is performed without activating a graphical user-operable control.

10. A data processing system comprising:
    a processor executing an application to perform data processing operations and to display data for a circuit design in a plurality of data view representations via a plurality of different graphical adjustable user interface configurations, said graphical adjustable user interface configurations configured to selectively include different pluralities one relative to the other of user-operable controls adjustably configured for one of a plurality of different types of data view representations of said electronic circuit design, each of said data view representations comprising a cellview for at least one abstraction level of representation for said electronic circuit design shared in common between said plurality of data view representations;
    a persistent storage system having separately stored therein said plurality of adjustable user interface configurations, each of said adjustable user interface configurations selectively associated with a corresponding one of said data view representations and defining a corresponding placement of an associated set of user-operable controls in a display; and,
    an event notification mechanism actuated responsive to said user-operable controls to transmit to said application a notification associated with selecting one of said data view representations, said application adaptively retrieving from said persistent storage system at least one of said adjustable user interface configurations based on the type of said data view representation selected and placing said corresponding set of user-operable controls in a graphical user interface for said selected data view representation.

11. The data processing system as recited in claim 10 further including a search and precedence system for searching said persistent storage system for said set of said interface configurations associated with said one of said data view representations and providing to said application said at least one of said interface configurations topmost in a selective order of precedence.

12. The data processing system as recited in claim 10, wherein said persistent storage system includes a file system, said plurality of interface configurations being stored as files in said persistent storage system in accordance with said file system.

13. The data processing system as recited in claim 12, wherein said persistent storage system is partitioned into a plurality of user volumes each containing a corresponding plurality of said adjustable interface configurations, each of said plurality of user volumes having a name provided by a user in accordance with said file system.

14. The data processing system as recited in claim 13 further including a search and precedence system for searching said file system for said at least one of said interface configurations associated with said one of said data view representations and providing to said application said set of said files topmost in a selective order of precedence of said volume names.

15. The data processing system as recited in claim 10 further including a selection control for selecting one of said set of said interface configurations to apply to said graphical user interface from among said at least one of said interface configurations retrieved by said application.

16. The data processing system as recited in claim 10 further including a default mechanism for specifying a default interface configuration from said at least one interface configurations retrieved by said application to apply to said graphical user interface.

17. The data processing system as recited in claim 10 further including a memory system for caching said set of interface configurations upon retrieval thereof from said persistent storage system.

18. A data processing system having a configurable user interface comprising:
a data storage device having stored therein a circuit design data respectively presentable to a user in at least a first and second data view representations of different type; said first and second data view representations each comprising a cellview for at least one abstraction level of representation for the circuit design;
a processor coupled to said data storage device and accessing said data therein, said processor executing a first instance of an application to perform data processing operations on said data;
an input/output system coupled to said processor to provide input to and output from said application, said input/output system including at least one input device for generating user-initiated events, said input/output system including an output device for displaying configurable controls generated by said application;
an application programming interface to said application operable by a designated user to associate said first data view representation respectively with a plurality of first configurable controls and to associate said second data view representation respectively with a different plurality of second configurable controls relative to said plurality of first configurable controls;
a user interface operable by an end user to select from said plurality of first configurable controls and to distribute said selected first configurable controls into at least a first configuration for said first data view representation, said user interface operable by said end user to select from said plurality of second configurable controls and to distribute said selected second configurable controls into at least a second configuration for said second data view representation;
a persistent storage system to separately store said first and second configurations of configurable controls to be retrievable by respective references to said first and said second data view representations upon corresponding association thereof by said application programming interface, said first and said second configurations of configurable controls being retrievable from said persistent storage system in a second instance of said application invoked subsequent to termination of said first instance of said application; and,
an event notification mechanism transmitting to said application responsive to said user-initiated events a notification associated with one of said first and second data view representations, said application adaptively retrieving from said persistent storage system at least one of said first and second configurations of configurable controls based on the selected type of data view representation of the circuit design indicated by said notification.

19. The data processing system as recited in claim 18, further comprising a memory cache for storing as a plurality of effective configurations selected ones of said plurality of first and second configurations of configurable controls retrieved from said persistent storage system, said application subsequently displaying on said user interface one of said effective configurations selected from said memory cache;
wherein said user interface stores one of said effective configurations to said persistent storage system upon activation of one of said controls.

20. The data processing system having a configurable user interface as recited in claim 18 further including a search and precedence mechanism for searching said persistent storage system and retrieving said plurality of configurations therefrom in accordance with a selective order of precedence.

* * * * *